US005844153A

United States Patent [19]

Schlatter et al.

[11] Patent Number: 5,844,153

[45] Date of Patent: Dec. 1, 1998

[54] COBALT BINDER METAL ALLOY

[75] Inventors: Manfred Schlatter, Freiburg; Jürgen Koppe, Schkopau; Volker Eichhorst, Halle, all of Germany

[73] Assignee: EMTEC Magnetics GmbH, Ludwigshafen, Germany

[21] Appl. No.: 679,623

[22] Filed: Jul. 12, 1996

[30] Foreign Application Priority Data

Jul. 12, 1995 [DE] Germany ........................ 295 11 247.6

[51] Int. Cl.[6] ............................ C22C 29/08; C04B 35/52

[52] U.S. Cl. ................................ 75/236; 75/240; 75/239; 75/246; 75/248; 75/252; 75/255; 501/87; 501/93

[58] Field of Search .............................. 75/233, 236, 239, 75/240, 246, 252, 255, 248; 501/87, 93; 420/435

[56] References Cited

U.S. PATENT DOCUMENTS

| | | | |
|---|---|---|---|
| 1,928,453 | 9/1933 | Kelly | 75/239 |
| 2,103,267 | 12/1937 | Mandell et al. | 420/435 |
| 2,121,759 | 6/1938 | Lowry | 420/435 |
| 2,471,016 | 5/1949 | Westmoreland-White | 501/87 |
| 3,301,645 | 1/1967 | Smiley | 501/87 |
| 3,445,624 | 5/1969 | Sunnen | 420/435 |
| 3,451,791 | 6/1969 | Meadows | 501/87 |
| 3,454,791 | 7/1969 | Mergner . | |
| 4,684,405 | 8/1987 | Kolaska et al. | 75/240 |
| 4,950,328 | 8/1990 | Odani et al. | 75/240 |
| 5,009,705 | 4/1991 | Yoshimura . | |
| 5,085,110 | 2/1992 | Scholtysik et al. . | |

FOREIGN PATENT DOCUMENTS

| | | | |
|---|---|---|---|
| 62 311 | 10/1982 | European Pat. Off. . | |
| 585823 | 10/1933 | Germany | 420/435 |
| 1458469 | 9/1972 | Germany | 420/435 |
| 208 174 | 3/1984 | Germany . | |
| 267 063 | 4/1989 | Germany . | |

*Primary Examiner*—Margery Phipps
*Attorney, Agent, or Firm*—Keil & Weinkauf

[57] ABSTRACT

A mixed metal powder for hard metal alloys comprising cobalt, 1 to 10 parts per weight tungsten and 1 to 10 parts by weight of aluminum and a hard metal alloy containing the mixed metal powder binder in an amount of from 2 to 12 parts by weight per about 100 parts by weight of a metal carbide for corrosion resistant hard metal tools.

13 Claims, No Drawings

COBALT BINDER METAL ALLOY

BACKGROUND OF THE INVENTION

The advantages of the cemented carbide system tungsten carbide/cobalt are, as is known per se, as follows:

cobalt completely wets the tungsten carbide phase.

cobalt is essentially not dissolved in the tungsten carbide.

tungsten carbide has a temperature-dependent solubility in cobalt.

small amounts of dissolved tungsten in the cobalt stabilize the body-centered cubic cobalt phase.

U.S. Pat. No. 3,454,791 describes a cobalt binder metal alloy for a tungsten carbide system for cutting tools, for cutting or shaping equipment for very hard materials. The tool body claimed comprises tungsten carbide and from 1 to 30% by weight of an acid-resistant cobalt alloy containing cobalt and from 8 to 33 parts by weight of tungsten per 100 parts by weight of cobalt. Uses indicated for the material described are steel cutting equipment, wire drawing tools, drilling tools and polishing media for steel. The excessive introduction of tungsten into the cobalt phase unavoidably leads to a reduction in the toughness of the cobalt binder metal alloy.

It is therefore proposed in DE-C 40 00 223 that defined amounts of vanadium and chromium compounds, such as carbides, nitrides, oxides or hydrides, be added to the cobalt alloy to reduce the amount of dissolved tungsten in the cobalt phase. This increases the expense of producing the cobalt base alloy.

EP-B 62 311 describes a chromium-nickel-cobalt base alloy containing an addition of 0.1–3% of aluminum. Above an aluminum content of 3%, the material becomes brittle as a result of precipitation of nickel-aluminum intermetallic compounds. This material is intended for hot-working machines, such as hot-rolling facilities and hot-forging tools, and has a corresponding high-temperature behavior.

DD Patent 208 174 describes a process for increasing the wear resistance of hard metal cutting bodies for cutting and non-cutting workpiece forming using chromium carbide, where from 20 to 50% by weight of pulverulent aluminum oxide ($Al_2O_3$) are mixed into the pulverulent diffusion medium comprising chromium carbide. The diffusion treatment was carried out in an inert atmosphere at 1200° C. The treated cemented carbide cutting plates should have a diffusion phase of chromium carbide distributed over the entire cross section. A cobalt binder metal alloy containing aluminum was not used here. These known cutting bodies can also be used for wood and fibrous materials, for example hardboard.

According to EP-B 275 909 of the present patent applicant, the cutting edges of knives are worn down very considerably when cutting films have abrasive layers, eg. magnetic tapes coated with metal pigment or oxides (iron oxide, chromium dioxide), which leads to even poorer cutting quality as cutting proceeds. Regrinding of the knives after removal from the machine makes the cutting edges sharp again, but this requires considerable expense and a shutdown of the cutting facility.

Although structural improvements of the cutting equipment described therein have led to increased operating lives of the knives, the knives are also subjected to attack by corrosion during use. It is therefore still necessary to find cutting material improvements in this respect as well.

BRIEF SUMMARY OF THE INVENTION

The present invention relates to a cobalt binder metal alloy for hard metal alloys for use in hard metal tools, in particular for cutting tools for metal or metal oxide layers of magnetic recording media, where the alloy comprises cobalt and tungsten and a proportion of aluminum, and also cemented carbide tools, in particular cutting tools for metal oxide layers of magnetic recording media, comprising metal carbide based on tungsten carbide and a binder metal alloy comprising cobalt and tungsten.

DETAILED DESCRIPTION OF THE INVENTION

It is an object of the present invention to improve the corrosion properties and the total lifetime of the cemented carbide materials, in particular for cutting tools for metal pigment or oxide layers of magnetic recording media.

We have found that this object is achieved by means of a cobalt binder metal alloy for hard metal tools, particularly for cutting tools for metal or metal oxide layers of magnetic recording media, where the alloy comprises cobalt and tungsten and a proportion of aluminum, wherein from about 1 to about 10 parts by weight of aluminum are present per 100 parts by weight of cobalt. This object is achieved in particular by a cemented carbide cutting tool made of an alloy containing from about 1 to about 10 parts by weight of tungsten and from about 4 to about 8 parts by weight of aluminum per 100 parts by weight of cobalt, and the aluminum is added as metallic aluminum pigment or as aluminum nitride pigment.

It has been found that the hard metal alloys in particular the cemented carbides of the present invention enable both the corrosion resistance and the total lifetime to be increased by more than a factor of 2, which more than halves the high costs of the knife materials.

According to DD Patent 267 063, the addition of aluminum does improve the hardness and the heat and corrosion resistance of cemented tungsten carbide, but not its wear behavior in the forming of very abrasive nonmetallic materials.

The invention is illustrated by the following example.

Hard metal alloys as cemented carbides based on tungsten carbide/cobalt are produced essentially as described below. The tungsten carbide is obtained by carburization of tungsten powder after mixing with carbon black under hydrogen at from about 1350°0 to about 1700° C., with the purity of the hydrogen and the temperature being the most important parameters for determining the particle size and the distribution of the particles in the process product. The carbon content of the tungsten carbide is maintained at about 6% by weight.

The finished powder for making the hard metal alloy as the cemented carbide is produced by milling, with addition of an organic liquid such as ethanol, of the possibly preformed tungsten carbide plus possibly other metal carbides, finely divided cobalt and aluminum powder or a mixture thereof and then pressing aids which are necessary later. During milling, eg. in ball mills or other suitable mills, the starting materials are further comminuted resulting in a very uniform distribution of the cobalt and the aluminum between the carbide particles. In the subsequent sintering process, an unsatisfactory distribution can no longer be completely rectified, although the cobalt may penetrate between the carbide particles The powder mixture suspended in the milling liquid is subsequently dried to produce a free-flowing and pressable granulated material having a particle size of from about 0.1 to about 0.3 mm.

Shaped parts such as cutting tools, etc. are produced by pressing in molds under a high pressure of up to 400 MPa (megapascal $\hat{=}N/mm^2$), taking into account the shrinkage on sintering, either by direct or indirect shaping, the latter via presintering. Sintering commences at a rising temperature up to about 600° C. with the driving off of the pressing aid under an inert atmosphere and is continued at from about 1350° to 1500° C. until the finished sintering product is obtained. The sintering process is monitored and controlled, with temperature, the change from inert gas to vacuum and the furnace atmosphere being continually monitored.

The aluminum can be in the form of aluminum pigment or as aluminum nitride pigment before production of the cemented carbide.

DESCRIPTION OF THE PREFERRED EMBODIMENT(S)

It has been found that the proportion of aluminum in the cobalt binder metal alloy should be from about 1 to about 10 parts by weight, but in particular from about 4 to 8 parts by weight, per 100 parts by weight of cobalt. The tungsten content should likewise be in the range from about 1 to about 10 parts by weight and preferably from about 4 to 8 parts by weight per 100 parts by weight of cobalt.

In the finished material of the hard metal tool or cemented carbide tool according to the invention, the proportion of the binder metal alloy should be from about 2 to about 12 parts by weight per 100 parts by weight of tungsten carbide, the alloy containing from about 1 to about 10 parts by weight of aluminum per 100 parts by weight of cobalt. When mention is made of tungsten carbide, it is also easily possible for titanium carbide and/or tantalum carbide and/or chromium carbide to be present in the amount indicated.

Particularly advantageous alloys were obtained with a tungsten content of from about 1 to about 10 parts by weight and an aluminum content of from about 4 to about 8 parts by weight per 100 parts by weight of cobalt.

The hard metal alloy material or cemented carbide material for producing the knives has, depending on its composition within the range of the proportions by weight claimed for the individual components, microhardness values from 13 to 18 GPa (gigapascal) and modulus of elasticity values of from 550 to 570 GPa.

In magnetic tape cutting units, particularly for magnetic tapes coated with chromium dioxide, cemented carbide knives comprising the above material (about 5% by weight of tungsten and about 6% by weight of aluminum) had a corrosion resistance improved by a factor of 2–3 and a tool life increased by a factor of at least 2, so that the requirement for expensive tools can be reduced to less than half while maintaining the same cutting quality.

A cobalt binder metal alloy for hard metal or cemented carbide tools contains from 1 to 10 parts by weight of aluminum per about 100 parts by weight of cobalt. A cemented carbide contains the above cobalt binder metal alloy comprising tungsten and cobalt in an amount of from 2 to 12 parts by weight per about 100 parts by weight of metal carbide(s), advantageously tungsten carbide. Hard metal or cemented carbide tools are cutting tools and other tools where corrosion resistance and long life are needed.

We claim:

1. A mixed metal powder binder for hard metal tools consisting essentially of a) from 1 to 10 parts by weight of aluminum, and b) from 1 to 10 parts by weight of tungsten per 100 parts by weight of cobalt.

2. The mixed metal powder binder of claim 1, comprising from about 4 to about 8 parts by weight of aluminum per 100 parts by weight of cobalt.

3. The mixed metal powder binder of claim 1, comprising from about 4 to about 8 parts by weight of tungsten per 100 parts by weight of cobalt.

4. The mixed metal powder binder of claim 1, wherein the aluminum is provided for by a metallic aluminum pigment or by an aluminum nitride pigment.

5. The mixed metal powder binder of claim 1, consisting essentially of a) from 4 to 8 parts by weight of aluminum, and b) from 1 to 10 parts by weight of tungsten per 100 parts by weight of cobalt, wherein the aluminum is provided for by a metallic aluminum pigment or by a aluminum nitride pigment.

6. A hard metal composition consisting essentially of i) from about 2 to about 12 parts by weight of a mixed metal powder binder consisting essentially of a) from 1 to 10 parts by weight of aluminum, b) from 1 to 10 parts by weight of tungsten, and per 100 parts by weight of cobalt, ii) per 100 parts by weight of a metal carbide selected from a group consisting of titanium carbide, tantalum carbide, chromium carbide and tungsten carbide.

7. The hard metal composition of claim 6, wherein the metal carbide is tungsten carbide.

8. The hard metal composition of claim 6, wherein the mixed metal powder binder comprises from about 4 to about 8 parts by weight of aluminum per 100 parts by weight of cobalt.

9. The hard metal composition of claim 6, comprising from about 5 to about 10 parts by weight of the mixed metal powder binder per 100 parts by weight of the metal carbide.

10. A hard metal tool consisting essentially of i) from about 2 to about 12 parts by weight of a mixed metal powder binder consisting essentially of a) from 1 to 10 parts by weight of aluminum, b) from 1 to 10 parts by weight of tungsten, and per 100 parts per weight of cobalt, ii) per 100 parts by weight of a metal carbide selected from a group consisting of titanium carbide, tantalum carbide, chromium carbide and tungsten carbide.

11. The hard metal tool of claim 10, wherein the metal carbide is tungsten carbide.

12. The hard metal tool of claim 10, wherein the mixed metal powder binder comprises from about 4 to about 8 parts by weight of aluminum per 100 parts by weight of cobalt.

13. The hard metal tool of claim 10, comprising from about 5 to about 10 parts by weight of the mixed metal powder binder per 100 parts by weight of the metal carbide.

* * * * *